United States Patent
Kleyn et al.

(10) Patent No.: US 9,728,064 B2
(45) Date of Patent: Aug. 8, 2017

(54) CARTRIDGE INTERDEPENDENCE SWITCH

(71) Applicant: HEWLETT PACKARD ENTERPRISE DEVELOPMENT LP, Houston, TX (US)

(72) Inventors: Gerald K. Kleyn, Houston, TX (US); Chanh V. Hua, Houston, TX (US); Jeffery Don Kopp, Cypress, TX (US); Keith J. Kuehn, Magnolia, TX (US); Kevin D. Conn, Montgomery, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/777,124

(22) PCT Filed: Apr. 3, 2013

(86) PCT No.: PCT/US2013/035141
§ 371 (c)(1),
(2) Date: Sep. 15, 2015

(87) PCT Pub. No.: WO2014/163633
PCT Pub. Date: Oct. 9, 2014

(65) Prior Publication Data
US 2016/0171868 A1  Jun. 16, 2016

(51) Int. Cl.
*G08B 21/18* (2006.01)
*G06F 13/14* (2006.01)
(Continued)

(52) U.S. Cl.
CPC ............ *G08B 21/18* (2013.01); *G06F 11/006* (2013.01); *G06F 11/3051* (2013.01);
(Continued)

(58) Field of Classification Search
CPC .. G08B 21/18; G08B 5/36; G08B 6/00; G06F 13/14; G06F 13/16; G06F 13/36; G06F 13/38
(Continued)

(56) References Cited

U.S. PATENT DOCUMENTS 6,718,472 B1   4/2004  Garnett
7,051,215 B2   5/2006  Zimmer et al.
(Continued)

FOREIGN PATENT DOCUMENTS

CN   1987815   6/2007
EP   2026210   2/2009
(Continued)

OTHER PUBLICATIONS

Borwn, A., et al.; "An Active Approach to Characterizing Dynamic Dependencies for Problem Determination in a Distributed Environment"; Integrated Network Management Proceedings, 2001 IEEE/IFIP International Symposium on, Seattle, WA, May 14-18, 2001; 14 pages.
(Continued)

*Primary Examiner* — Hung T Nguyen
(74) *Attorney, Agent, or Firm* — International IP Law Group, PLLC

(57) ABSTRACT

Techniques for identifying interdependent cartridges are described herein. In one example, a method can detect a signal from an indication switch on a first cartridge, wherein the signal results from a user manually actuating the indication switch. The method can also detect a second interdependent cartridge based on interdependence information. Furthermore, the method can activate an interdependence indicator on the first cartridge and an interdependence indicator on the second cartridge.

15 Claims, 3 Drawing Sheets

(51) Int. Cl.
*G06F 13/16* (2006.01)
*G06F 13/38* (2006.01)
*G06F 13/36* (2006.01)
*G08B 5/36* (2006.01)
*G08B 6/00* (2006.01)
*G06F 11/00* (2006.01)
*G06F 11/30* (2006.01)

(52) U.S. Cl.
CPC .............. *G06F 13/14* (2013.01); *G06F 13/16* (2013.01); *G06F 13/36* (2013.01); *G06F 13/38* (2013.01); *G08B 5/36* (2013.01); *G08B 6/00* (2013.01)

(58) Field of Classification Search
USPC ................ 340/540, 635, 657, 815.4, 815.43; 359/107, 227, 280, 281; 362/133, 551
See application file for complete search history.

(56) References Cited

U.S. PATENT DOCUMENTS

| | | | |
|---|---|---|---|
| 7,129,851 B1 * | 10/2006 | Garnett | G06F 1/18 340/540 |
| 7,738,242 B2 | 6/2010 | McGraw et al. | |
| 2006/0203460 A1 | 9/2006 | Aviv | |
| 2007/0234126 A1 | 10/2007 | Lu et al. | |
| 2008/0040463 A1 | 2/2008 | Brown et al. | |
| 2009/0210735 A1 | 8/2009 | Brown | |
| 2009/0319761 A1 | 12/2009 | Bostanci et al. | |
| 2010/0131854 A1 | 5/2010 | Little | |
| 2012/0133524 A1 | 5/2012 | Anderson et al. | |

FOREIGN PATENT DOCUMENTS

| | | |
|---|---|---|
| EP | 2026210 A1 | 2/2009 |
| TW | 200834381 A | 8/2008 |
| TW | 200949546 | 2/2009 |
| TW | I340902 | 4/2011 |

OTHER PUBLICATIONS

IBM Advanced Management Module Messages Guide, (Research Paper), Dec. 2012, 338 pps., http://publib.boulder.ibm.com/infocenter/bladectr/documentation/topic/com.ibm.bladecenter.advmgtmod.doc/kp1avAMMMessagesGuide.pdf.

PCT; "Notification of Transmittal of the International Search Report and the Written Opinion of the International Searching Authority, or the Declaration" cited in PCT/US2013/035141; mailed Jan. 15, 2014; 10 pages.

Extended European Search Report dated Dec. 9, 2016 for EP Application No. 13881272.2; pp. 7.

\* cited by examiner

300

CARTRIDGE INTERDEPENDENCE SWITCH

CROSS-REFERENCE TO RELATED APPLICATION

Pursuant to 35 U.S.C. §371, this application is a United States National Stage Application of International Patent Application No. PCT/US13/035141, filed on Apr. 3, 2013, the contents of which are incorporated by reference as if set forth in their entirety herein.

BACKGROUND

Networked computing systems generally include host computing devices configured to provide resources such as storage, applications, databases, and the like. The host computing device may be a server such as a database server, file server, mail server, print server, web server, or some other type of server configured to provide services to client devices within a network.

A blade server is a server computer having a modular design optimized to minimize the use of physical space. Whereas a standard chassis mount server can function with a power cord and network cable, a blade server has many components removed for the purpose of saving space, minimizing power consumption and other considerations, while still having all the functional components to be considered a computer. A multi-slot chassis can hold multiple blade cartridges and provide shared resources such as power, cooling, networking, various interconnects, and management.

BRIEF DESCRIPTION OF THE DRAWINGS

Certain examples are described in the following detailed description and in reference to the drawings, in which.

DETAILED DESCRIPTION OF SPECIFIC EMBODIMENTS

The present techniques relate to an indication switch that can indicate the interdependence of any suitable number of cartridges in a chassis. An indication switch, as referred to herein, includes any suitable button, switch, and the like that can indicate the interdependence of multiple cartridges. A cartridge, as referred to herein, includes any suitable enclosure that can house a processor, a storage device, additional hardware components, or any combination thereof. In some embodiments, any suitable number of cartridges can be included in a chassis, which can facilitate communication between the cartridges. In some examples, each cartridge in a chassis can include an indication switch. The selection of one indication switch in a first cartridge can result in multiple interdependence indicators providing an indication that additional cartridges are interdependent with the first cartridge.

In some embodiments, each cartridge is hot-pluggable, which enables each cartridge to be removed while additional cartridges in the chassis continue to function. Before removing a hot-pluggable cartridge, a technician may seek to determine how removing a hot-pluggable cartridge may affect other cartridges. If the technician removes a storage cartridge that two other cartridges use to store data, the technician may inadvertently prevent instructions from executing on the two cartridges that use the storage cartridge. In some examples, the technician can activate an indication switch to determine whether removing a cartridge from a chassis may affect the execution of instructions within additional cartridges in the chassis.

Figure 1:
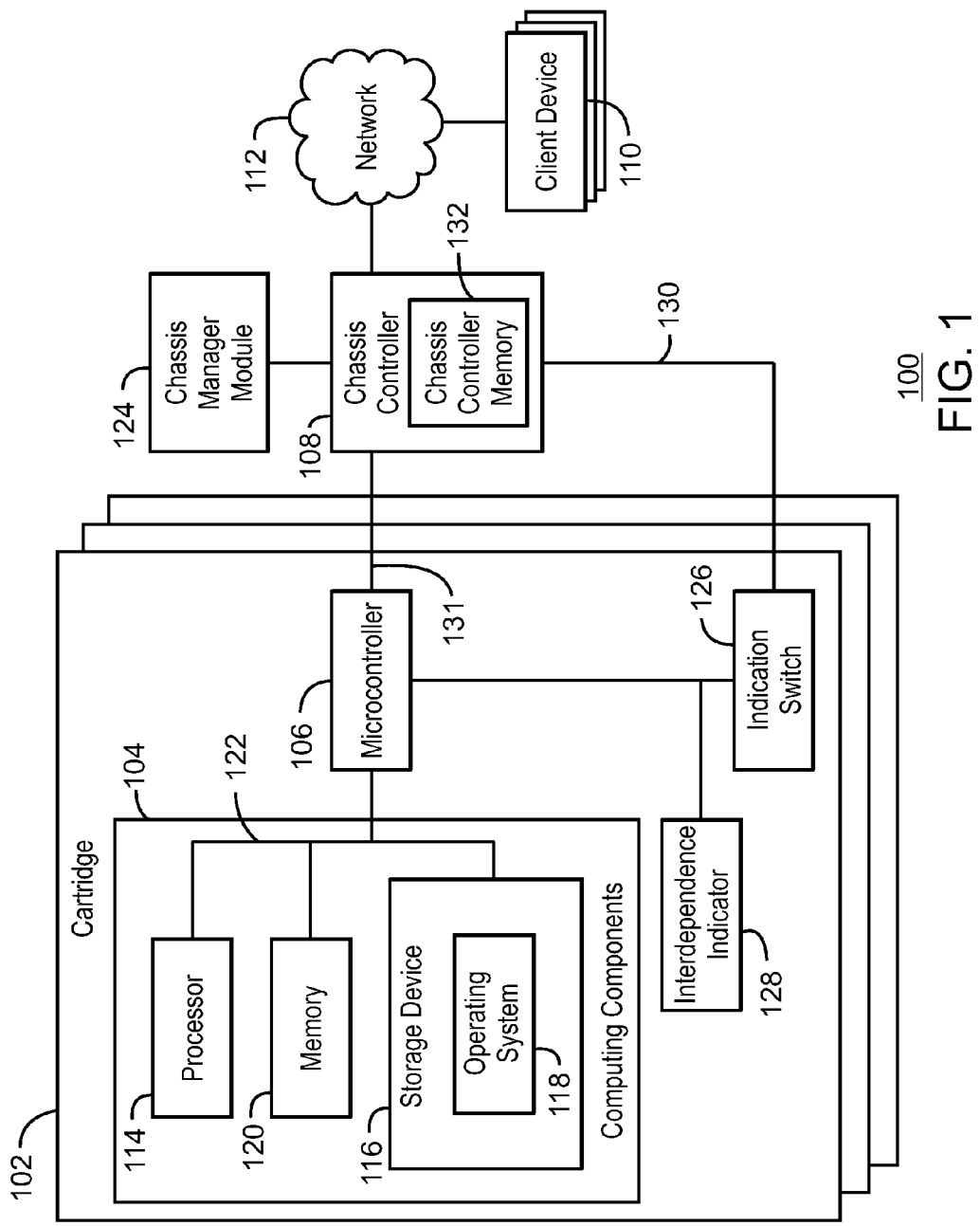
FIG. 1 is a block diagram illustrating a cartridge including computing resources and an indication switch.

FIG. 1 is a block diagram illustrating a system including a cartridge with an indication switch. The system 100 can include any suitable number of cartridges 102, which can include any suitable number of computing components 104. In some embodiments, a microcontroller 106 may monitor the computing components 104. The microcontroller 106 may receive data associated with the operation of the computing components 104, and provide the data to a chassis controller 108 that is located external to the cartridge 102. In some embodiments, the chassis controller 108 can provide data to a client device 110 through a network 112.

As illustrated in FIG. 1, the cartridge 102 may be one of many cartridges of various types. For example, the chassis may include compute nodes and storage nodes. Compute nodes can include one or more processors and memory for performing calculations and manipulating data in accordance with programming instructions. The compute nodes may be general purpose compute nodes. Furthermore, some compute nodes may be specialized compute nodes that perform specialized operations such as Input/Output (I/O) to a network, for example. Storage nodes can include memory, such as disk drives, solid-state memory such as Flash memory, and the like.

The computing components 104 of each cartridge 102 may include various components such as a processor 114 and a storage device 116. The storage device 116 may include an operating system 118. The operating system 118 may be executed by a processor of a host computing system such as the processor 114 of the computing components 104. In some embodiments, the storage device 116 has instructions stored thereon that, when executed by the processor 114, cause the computing components 104 to perform operations. In some embodiments, the operations include responding to requests from one of the client devices 110. The computing components 104 may also include a memory device 120 that, in some embodiments, stores instructions that are executable by the processor 114. The processor 114 can be a single core processor, a multi-core processor, a computing cluster, or any number of other configurations. The processor 114 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 120 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The main processor 114 may be connected through a system bus 122 (e.g., PCI, ISA, PCI-Express, HyperTransport®, NuBus, etc.) to the other computing components 104. The system bus 122 may communicatively couple the microcontroller 106 to the computing components 104.

The microcontroller 106 monitors the computing components 104 and provides data related to the computing components 104 to the chassis controller 108, as explained in more detail below. The microcontroller 106 at least partially includes hardware logic. Hardware logic at least partially includes hardware, and may also include software, or firmware. Hardware logic may include electronic hardware including interconnected electronic components that perform analog or logic operations on received and locally stored information to produce an output or store resulting new information or to provide control for output actuator mechanisms. Electronic hardware may include individual chips/circuits and distributed information processing systems.

The system 100 also includes a chassis manager module 124. The chassis manager module 124 may include a display (not shown) having a graphical administrative interface. The chassis manager module 124 may be networked with the cartridge 102 to enable a system administrator to remotely interface with the cartridge 102 via the chassis controller 108.

In some embodiments, the chassis controller 108 can detect interdependence information from the microcontroller 106 of a cartridge 102. Interdependence information, as referred to herein, can include any suitable data that indicates a first cartridge relies on a second cartridge. In some embodiments, a first cartridge can rely on a second cartridge for shared data, or shared operations that are executed in parallel among several cartridges, and the like. In some embodiments, the cartridge 102 can also include an indication switch 126 that can provide the interdependence information to a user through an interdependence indicator 128 in the computing components 104. The interdependence indicator 128 can include any suitable indication such as a light or haptic feedback, among others, that can indicate the interdependence information for a cartridge 102. In response to detecting the selection of an indication switch 126, the chassis controller 108 can provide a signal to a second interdependence indicator through any suitable system interconnect 130 or 131. In some embodiments, the chassis controller 108 may also provide a signal to a second interdependence indicator through a system bus 122. The second interdependence indicator can indicate whether a second cartridge is dependent on the first cartridge 102 for shared data, processing power, and the like. In some examples, interdependence information can also be shared with a client device 110.

In some embodiments, the system 100 includes multiple sets of general purpose connections between each cartridge 102. For example, a first cartridge 102 may use a general purpose connection for storage and a second cartridge, which includes a storage device 116, may receive data through the general purpose connection. In some examples, the chassis controller 108 may detect that the first cartridge and the second cartridge are interdependent based on the shared general purpose connection.

In some embodiments, the chassis controller 108 can independently detect interdependence information related to any suitable number of cartridges 102. For example, the chassis controller 108 may monitor communications between cartridges 102 and determine that cartridges 102 are sharing data, operations, or special purpose instructions such as input/output instructions, among others. In some embodiments, the chassis controller 108 can include chassis controller memory 132 that stores the interdependence information. In some embodiments, the chassis controller memory 132 can store a predetermined table that indicates the interdependent relationship among the cartridges 102. If the chassis controller 108 receives a signal from an indication switch 126, the chassis controller 108 can provide an instruction to interdependence indicators in additional cartridges to display interdependence information. In some embodiments, interdependence indicators 128 can display interdependence information by displaying different colors that relate to different interdependent states, such as sharing data or sharing processing power.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional memory devices, additional indication switches 126, additional interdependence indicators 128, additional network interfaces, etc.). In some embodiments, each cartridge 102 may include multiple indication switches 126 and multiple interdependence indicators 128. Furthermore, any of the functionalities of the chassis controller 108 may be partially, or entirely, implemented in any suitable hardware component such as the processor 102. For example, the functionality may be implemented with an application specific integrated circuit, in logic implemented in the processor 102, in an indication switch 126, an interdependence indicator 128, in a microcontroller 106, or in a co-processor on a peripheral device, among others.

Figure 2:
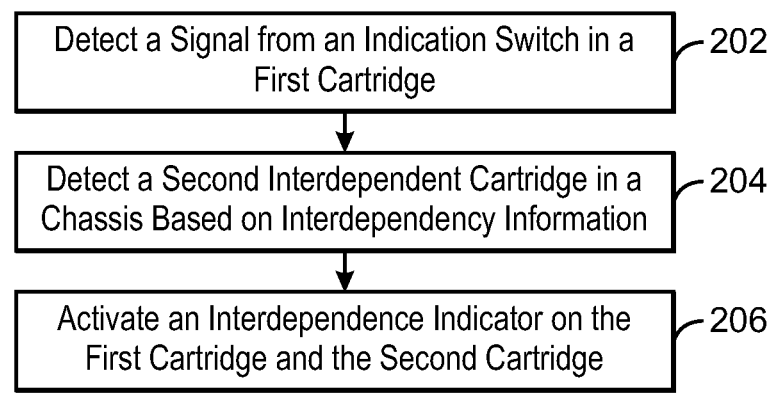
FIG. 2 is a process flow diagram of an example of a method for providing interdependence information to a user through a chassis controller.

FIG. 2 is a process flow diagram of an example of a method for providing interdependence information to a user through a chassis controller. The method 200 can be implemented with any suitable computing device, such as the system 100 of FIG. 1 or a chassis that can include any suitable number of cartridges 102 of FIG. 1, chassis controllers 108 of FIG. 1, and chassis manager modules 124 of FIG. 1.

At block 202, the chassis controller 108 can detect a signal from an indication switch in a first cartridge. As discussed above, a cartridge can include storage devices, processing devices, or special purpose devices. For example, a cartridge may execute special purpose instructions such as input/output instructions. In some embodiments, each cartridge can include an indication switch that can generate a signal to provide interdependence information. The interdependence information can include whether a cartridge is sharing data with additional cartridges, whether a cartridge is executing an instruction for a second cartridge, or whether a cartridge is providing a special purpose for a second cartridge, among others. In some examples, a special purpose may include a first cartridge executing input/output instructions, or video display instructions, among others for a second cartridge. In some embodiments, the indication switch can produce the signal in response to a user manually actuating the indication switch.

At block 204, the chassis controller 108 can detect a second interdependent cartridge in a chassis based on interdependence information. In some embodiments, interdependence information is stored in a memory device within the chassis controller. The interdependence information can be updated whenever a cartridge in the chassis receives power or whenever a cartridge is selected by a user during a configuration process. For example, a user may provide the interdependence information through a software application that forwards the interdependence information to the chassis module. Alternatively, an operating system may detect interdependence information and forward the interdependence information to the chassis controller.

At block 206, the chassis controller 108 can activate an interdependence indicator on the first cartridge and the second cartridge. In some embodiments, the chassis controller can activate an interdependence indicator by generating an instruction that provides power to the interdependence indicator. In some embodiments, the instruction can indicate that the interdependence indicators in any suitable number of cartridges are to display a color based on the interdependence information. For example, the interdependence indicators may display any suitable color that corresponds to cartridges sharing data, sharing processing power, or sharing a special purpose, among others. In some embodiments, the interdependence indicators may provide haptic feedback such as a vibration.

In some embodiments, a user can detect interdependent cartridges in a chassis by observing the interdependence indicators in the cartridges. For example, any suitable number of cartridges in a chassis may be interdependent. In some embodiments, any number of the cartridges may display interdependence information through interdependence indicators, which indicate to a user the cartridges that are sharing data, processing power, or a special purpose.

The process flow diagram of FIG. 2 is not intended to indicate that the operations of the method 200 are to be executed in any particular order, or that all of the operations of the method 200 are to be included in every case. For example, the chassis controller 108 may detect interdependent cartridges prior to detecting a signal from an indication switch in a cartridge. Further, any number of additional steps may be included within the method 200, depending on the specific application.

Figure 3:
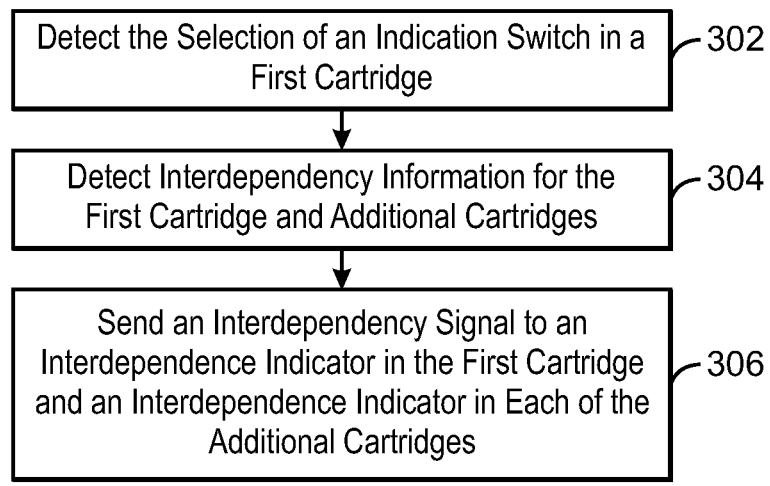
FIG. 3 is a process flow diagram of an example of a method for providing interdependence information to a user through a microcontroller in a cartridge.

FIG. 3 is a process flow diagram of an example of a method for providing interdependence information to a user through a microcontroller in a cartridge. The method 300 can be implemented with any suitable computing device, such as system 100 of FIG. 1.

At block 302, a microcontroller in a cartridge can detect the selection of an indication switch in a first cartridge. As discussed above, an indication switch can include any suitable button, switch, and the like that can indicate the interdependence of multiple cartridges. In some embodiments, selection of the indication switch can send a signal to the microcontroller in a cartridge.

At block 304, the microcontroller can detect interdependence information for the first cartridge and additional cartridges. In some embodiments, interdependence information is stored in a memory device within each cartridge. The interdependence information can be updated whenever a cartridge receives power or whenever a cartridge is selected by a user during a configuration process. For example, a user may provide the interdependence information through a software application that stores the interdependence information in a memory device in the cartridge. In some examples, each microcontroller may monitor instructions sent to additional cartridges and detect interdependence information.

At block 306, the microcontroller can send an interdependency signal to an interdependence indicator in the first cartridge and interdependence indicators in additional cartridges. An interdependency signal, as referred to herein, can include any signal or instruction that notifies an interdependence indicator to display a particular color, light, or provide haptic feedback, among others. In some embodiments, a microcontroller can detect interdependence information based on communications with additional cartridges. For example, a microcontroller may send a message to additional cartridges through any suitable system interconnect. The additional cartridges may return information in response to the message that indicates the additional cartridges are sharing data, processing power, or a special purpose with the cartridge that generated the message. In some embodiments, the microcontroller can send information and interdependency signals through a chassis controller to additional cartridges.

The process flow diagram of FIG. 3 is not intended to indicate that the operations of the method 300 are to be executed in any particular order, or that all of the operations of the method 300 are to be included in every case. Further, any number of additional steps may be included within the method 300, depending on the specific application.

The present examples may be susceptible to various modifications and alternative forms and have been shown only for illustrative purposes. Furthermore, it is to be understood that the present techniques are not intended to be limited to the particular examples disclosed herein. Indeed, the scope of the appended claims is deemed to include all alternatives, modifications, and equivalents that are apparent to persons skilled in the art to which the disclosed subject matter pertains.

What is claimed is:

1. A method for identifying interdependent cartridges executed by a microcontroller comprising:
    detecting a signal from an indication switch on a first cartridge, wherein the signal results from a user manually actuating the indication switch;
    detecting a second interdependent cartridge based on interdependence information; and
    activating an interdependence indicator on the first cartridge and an interdependence indicator on the second cartridge by the microcontroller.

2. The method of claim 1, wherein the first cartridge and the second cartridge reside in a chassis.

3. The method of claim 1, wherein the interdependence indicators display a different color based on the interdependence information.

4. The method of claim 3, wherein the interdependence information indicates that the first cartridge and the second cartridge share one of data and processing power.

5. The method of claim 1 comprising detecting the interdependence information by monitoring communications between the first cartridge and the second cartridge using a general purpose connection.

6. A system for identifying interdependent cartridges comprising:
    a memory device to store interdependence information; and
    a chassis controller to:
        detect a signal from an indication switch on a first cartridge, wherein the signal results from a user manually actuating the indication switch;
        detect a plurality of interdependent cartridges based on interdependence information, wherein the plurality of interdependent cartridges reside in a chassis with the first cartridge; and
        activate an interdependence indicator on the first cartridge and an interdependence indicator on each of the plurality of interdependent cartridges.

7. The system of claim 6, wherein the interdependence indicators provide interdependence information through haptic feedback.

8. The system of claim 6, wherein the interdependence indicators display a different color based on the interdependence information.

9. The system of claim 8, wherein the interdependence information indicates that the first cartridge and a second cartridge share one of data and processing power.

10. The system of claim 6, wherein the chassis controller is to detect the interdependence information by retrieving the interdependence information from a remote computing system.

11. A system for identifying interdependent cartridges comprising:
- a memory device to store interdependence information; and
- a microcontroller to:
    - detect the selection of an indication switch in a first cartridge;
    - detect interdependence information for the first cartridge and a second cartridge; and
    - send an interdependence signal to an interdependence indicator in the first cartridge and an interdependence indicator in the second cartridge.

12. The system of claim 11, wherein the first cartridge and the second cartridge reside in a chassis.

13. The system of claim 11, wherein the interdependence indicator displays a different color based on the interdependence information.

14. The system of claim 13, wherein the interdependence information indicates that the first cartridge and the second cartridge share one of data and processing power.

15. The system of claim 11, wherein the microcontroller is to detect the interdependence information by monitoring communications between the first cartridge and the second cartridge using a general purpose connection.

\* \* \* \* \*